(12) United States Patent
Okamura

(10) Patent No.: US 7,139,126 B2
(45) Date of Patent: Nov. 21, 2006

(54) OPTICAL ELEMENT, LENS AND OPTICAL HEAD DEVICE

(75) Inventor: Tetsuro Okamura, Nagano (JP)

(73) Assignee: Nidec Nissin Corporation, Nagano (JP)

( * ) Notice: Subject to any disclaimer, the term of this patent is extended or adjusted under 35 U.S.C. 154(b) by 120 days.

(21) Appl. No.: 10/911,411

(22) Filed: Aug. 3, 2004

(65) Prior Publication Data

US 2005/0036204 A1     Feb. 17, 2005

(30) Foreign Application Priority Data

Aug. 11, 2003    (JP) .............................. 2003-207206

(51) Int. Cl.
G02B 5/18        (2006.01)
(52) U.S. Cl. .................. 359/571; 369/112.03
(58) Field of Classification Search ................ 359/566, 359/569, 571; 369/112.03, 112.06, 112.07, 369/112.11, 112.12
See application file for complete search history.

(56) References Cited

U.S. PATENT DOCUMENTS 6,728,042 B1 *  4/2004  Ota et al. .................... 359/637
6,898,168 B1 *  5/2005  Kimura et al. ......... 369/112.01

FOREIGN PATENT DOCUMENTS

JP        2000-081566        3/2000

* cited by examiner

Primary Examiner—Alessandro Amari
(74) Attorney, Agent, or Firm—Hogan & Hartson LLP

(57) ABSTRACT

An optical element includes a diffraction grating by which both a first laser beam and a second laser beam are diffracted. A diffraction performance of the diffraction grating is expressed by an optical path difference function, a third spherical aberration $SA3_1$ of the first laser beam and a third spherical aberration $SA3_2$ of the second laser beam in a wave front aberration calculated by the optical path difference function satisfy the following conditional expressions:

$$0.005 < |SA3_1 - SA3_2| < 0.015 [\lambda rms]$$

$$SA3_1 \times SA3_2 < 0.$$

10 Claims, 7 Drawing Sheets

(a)

(b)

Actual Measurements for DVD (a) Third Spherical Aberration (b) Fifth Spherical Aberration (c) Seventh Spherical Aberration (d) Ninth Spherical Aberration (e) Fifth, Seventh, ninth Spherical Aberration

OPTICAL ELEMENT, LENS AND OPTICAL HEAD DEVICE

BACKGROUND OF THE INVENTION

1. Field of the Invention

The present invention relates to an optical element and a lens which diffracts and converges laser beams with different wavelengths and an optical head device which is used for recording on or reproducing from an optical recording medium such as a CD or a DVD having substrate thicknesses different from each other by means of using laser beams with different wavelengths.

2. Description of Related Art

CDs and DVDs having transparent protective layers with different thickness for protecting their recording surfaces and having different recording densities, are known as optical recording media. A laser beam with a wavelength of 655 nm is used to reproduce data from a DVD and a laser beam with a wavelength of 785 nm is used to reproduce and record data on a CD (CD-R is included).

For example, a conventional optical head device for performing recording and reproduction of data on or from an optical recording medium is constructed so that a laser beam converges on the recording surface of a CD or a DVD by means of a common objective lens to attain its miniaturization and compactness.

The thickness of the transparent protective layer of a CD for protecting its recording surface is 1.2 mm. The thickness of the transparent protective layer of a DVD is 0.6 mm, which is thinner than that of the CD, and its recording density is higher than that of a CD. Accordingly, an objective lens has been proposed in which a diffraction grating including concentrically circular fine step portions are formed on an incident side refraction face provided with a prescribed shape of an aspheric surface. With the objective lens, the incident light beam is diffracted by the diffraction grating to satisfactorily focus on the recording surface of two types of the optical recording media having a thickness of the transparent protective layer different from each other.

In order to construct such an objective lens, the shape of the aspheric surface expressing the refraction shown in FIG. 5(a) is obtained at the time of the optical design by using the following expression:

$$z(h) \frac{h^2}{r\left(1+\sqrt{1-\frac{1+(k)h^2}{r^2}}\right)} + \left(\sum_{i=0}^{1} a_i h^{(2i)}\right)$$

Further, the ray tracing is performed with the optical path difference function representing the diffraction, which is expressed as the following expression, to make a correction such that the aberration may be zero.

$$\Theta(h) = \lambda \sum_{i=0}^{1} b_j h^{(2j)}$$

Then, the result is replaced in the shape of the blaze working as shown in FIG. 5(b). The shape correction corresponding to the incidence angle is performed on the refraction face in the shape of the blaze shown in FIG. 5(b). Here, "r" means the radius of curvature of the center, "k" means the conical coefficient, "h" means the height from the optical axis, "$\lambda$" means the wavelength, and "$a_i$" and "$b_j$" mean the coefficient of the polynomial.

When the blaze height is determined with the wavelength $\lambda_B$, the height of the blaze component from the aspheric surface is calculated by the following expression:

$$\phi(\lambda_B)/(n-1)$$

wherein "$\phi$" is the optical path difference function and "n" is the refractive index. In this case, the "$\lambda_B$" is referred to as the blaze wavelength.

However, according to the conventional optical design, the blaze wavelength is determined by the following relationship:

$$\lambda_1 < \lambda_B < \lambda_2;$$

wherein $\lambda_1$=the wavelength of the laser beam for a DVD $\lambda_2$=the wavelength of the laser beam for a CD Therefore, when the diffraction face is used with the wavelength $\lambda_1$, the difference between the case at is blazed with the wavelength $\lambda_1$ and the case that is blazed with the wavelength $\lambda_B$ causes a large spherical aberration $SA_1$ for the wavelength $\lambda_1$. In addition, when the diffraction face is used with the wavelength $\lambda_2$, the difference between the case that is blazed with the wavelength $\lambda_2$ and the case that is blazed in the wavelength $\lambda_B$ causes a large spherical aberration $SA_2$ for the wavelength $\lambda_2$. As a result, at the time of recording and reproduction for a DVD, desired pickup characteristics are not obtained due to the large aberration.

SUMMARY OF THE INVENTION

In view of the problems described above, it is an advantage of the present invention to provide an optical element, a lens and an optical head device which are capable of obtaining desired pickup characteristics when light beams with different wavelengths use a common diffraction region of the optical element or the lens.

In order to solve the problems, according to the present invention, an optical element, a lens and an optical head device are constructed as follows.

In accordance with an embodiment of the present invention, there is provided with an optical element for diffracting and converging a first laser beam and a second laser beam with a wavelength longer than a wavelength of the first laser beam. The optical element includes a diffraction grating by which both the first laser beam and the second laser beam are diffracted. In the diffraction grating, the diffraction performance of the diffraction grating is expressed by an optical path difference function, and a third spherical aberration $SA3_1$ of the first laser beam and a third spherical aberration $SA3_2$ of the second laser beam in a wave front aberration calculated by the optical path difference function satisfy the following conditional expressions:

$$0.005 < |SA3_1 - SA3_2| < 0.015 \ [\lambda \text{rms}]$$

$$SA3_1 \times SA3_2 < 0$$

In accordance with an embodiment of the present invention, there is provided with a lens for diffracting and converging a first laser beam and a second laser beam with a wavelength longer than a wavelength of the first laser beam. The lens includes a diffraction grating by which both the first laser beam and the second laser beam are diffracted.

In the diffraction grating, the diffraction performance of the diffraction grating is expressed by an optical path difference function, and a third spherical aberration $SA3_1$ of the first laser beam and a third spherical aberration $SA3_2$ of the second laser beam in a wave front aberration calculated by the optical path difference function satisfy the following conditional expressions:

$$0.005 < |SA3_1 - SA3_2| < 0.015 \ [\lambda rms]$$

$$SA3_1 \times SA3_2 < 0$$

In accordance with an embodiment of the present invention, there is provided with an optical head device including a first laser beam which is emitted from a first laser light source and converges on the recording surface of a first optical recording medium, a second laser beam with a wavelength longer than a wavelength of the first laser beam, the second laser beam being emitted from a second laser light source and converging on the recording surface of a second optical recording medium having a transparent protective layer thicker than the transparent protective layer of the first optical recording medium. The optical head device also includes a common optical element disposed on a common optical path of the first laser beam and the second laser beam for diffracting and guiding the first laser beam and the second laser beam on the recording surface of the first optical recording medium and the recording surface of the second optical recording medium, and a diffraction grating provided on the common optical element by which both of the first laser beam and the second laser beam are diffracted. In the diffraction grating, a diffraction performance of the diffraction grating is expressed by an optical path difference function, and a third spherical aberration $SA3_1$ of the first laser beam and a third spherical aberration $SA3_2$ of the second laser beam in a wave front aberration calculated by the optical path difference function satisfy the following conditional expressions:

$$0.005 < |SA3_1 - SA3_2| < 0.015 \ [\lambda rms]$$

$$SA3_1 \times SA3_2 < 0$$

An optical design for the diffraction grating by which both the first laser beam and the second laser beam are diffracted is performed so as to reduce aberration by executing the ray tracing using both the function expressing the shape of the aspheric surface and the function expressing the optical path difference. In this case, when the aberration is corrected so as to be zero, the difference between the wavelength of the first laser beam and the blaze wavelength and the difference between the wavelength of the second laser beam and the blaze wavelength cause the spherical aberration to directly occur. Accordingly, in accordance with an embodiment of the present invention, a prescribed aberration is taken into account so as to occur in advance in the optical path difference function. In other words, at the step of optical design for the diffraction grating, a prescribed aberration is anticipated and preset such that the aberration after blaze machining has been performed becomes actually small. Therefore, the difference between the wavelength of the first laser beam and the blaze wavelength and the difference between the wavelength of the second laser beam and the blaze wavelength do not cause the aberration to occur directly. Accordingly, the aberration when the actual machining has been performed can be reduced.

In accordance with an embodiment of the present invention, there is provided with an optical element for diffracting and converging a first laser beam and a second laser beam with a wavelength longer than a wavelength of the first laser beam. The optical element includes a diffraction grating by which both the first laser beam and the second laser beam are diffracted. In the optical element having the construction described above, the fifth spherical aberration $SA5_1$, the seventh spherical aberration $SA7_1$, and the ninth spherical aberration $SA9_1$ of the first laser beam, and the fifth spherical aberration $SA5_2$ of the second laser beam satisfy the following conditional expressions:

$$0.005 < |SA5_1 - SA5_2| < 0.015 [\lambda rms]$$

$$0.001 < |SA5_1| < 0.015 [\lambda rms]$$

$$(SA5_1)^2 + (SA7_1)^2 + (SA9_1)^2 < 0.0002 [\lambda rms]^2$$

In accordance with an embodiment of the present invention, there is provided with a lens for diffracting and converging a first laser beam and a second laser beam with a wavelength longer than a wavelength of the first laser beam. The lens includes a diffraction grating by which both the first laser beam and the second laser beam are diffracted. In the lens having the construction described above, the fifth spherical aberration $SA5_1$, the seventh spherical aberration $SA7_1$, and the ninth spherical aberration $SA9_1$ of the first laser beam, and the fifth spherical aberration $SA5_2$ of the second laser beam are set to satisfy following conditional expressions:

$$0.005 < |SA5_1 - SA5_2| < 0.015 [\lambda rms]$$

$$0.001 < |SA5_1| < 0.015 [\lambda rms]$$

$$(SA5_1)^2 + (SA7_1)^2 + (SA9_1)^2 < 0.0002 [\lambda rms]^2$$

In accordance with an embodiment of the present invention, there is provided with an optical head device including a first laser beam which is emitted from a first laser light source and converges on a recording surface of a first optical recording medium, a second laser beam with a wavelength longer than a wavelength of the first laser beam, the second laser beam being emitted from a second laser light source and converging on a recording surface of a second optical recording medium having a transparent protective layer thicker than a transparent protective layer of the first optical recording medium and a common optical element disposed on a common optical path of the first laser beam and the second laser beam for diffracting and guiding the first laser beam and the second laser beam on the recording surface of the first optical recording medium and the recording surface of the second optical recording medium. A diffraction grating is provided on the common optical element by which both the first laser beam and the second laser beam are diffracted. In the optical head device having the construction described above, the fifth spherical aberration $SA5_1$, the seventh spherical aberration $SA7_1$, and the ninth spherical aberration $SA9_1$ of the first laser beam, and the fifth spherical aberration $SA5_2$ of the second laser beam satisfy following conditional expressions:

$$0.005 < |SA5_1 - SA5_2| < 0.015 [\lambda rms]$$

$$0.001 < |SA5_1| < 0.015 [\lambda rms]$$

$$(SA5_1)^2 + (SA7_1)^2 + (SA9_1)^2 < 0.0002 [\lambda rms]^2$$

In the embodiment of the present invention, according to the results that the effect to the jitter is examined with the spherical aberration as a parameter, the jitter characteristics can be improved when the spherical aberration is set within the range of the above-mentioned conditional expressions.

In accordance with an embodiment of the present invention, the optical element is an objective lens that is provided with an incident side refraction surface and an emitting side refraction surface formed in a prescribed aspheric surface shape, one of the incident side refraction surface and the emitting side refraction surface being divided into an inner side refraction surface region and an outer side refraction surface region around an optical axis of the object lens, and an inner side diffraction grating is formed at least all over the inner side refraction surface region and is provided with a number of minute steps in a concentrically circle-shape. Further, the objective lens is constructed such that the beam passing through the outer side refraction surface region and the diffracted beam which is obtained through the inner side refraction surface region are used in the case of recording and reproduction for the first optical recording medium by using the first laser light source, and the diffracted beam which is obtained through the inner side refraction surface region is used in the case of recording and reproduction for the second optical recording medium by using the second laser light source.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 4(a) is a plan view of the objective lens, FIG. 4(b) is its cross-sectional view, and FIGS. 4(c) and 4(d) are partly enlarged cross-sectional views of the objective lens shown in FIG. 4(b).

DETAILED DESCRIPTION OF THE PREFERRED EMBODIMENTS

An optical head device provided with an objective lens in accordance with an embodiment of the present invention will be described below with reference to the accompanying drawings.

Figure 1:
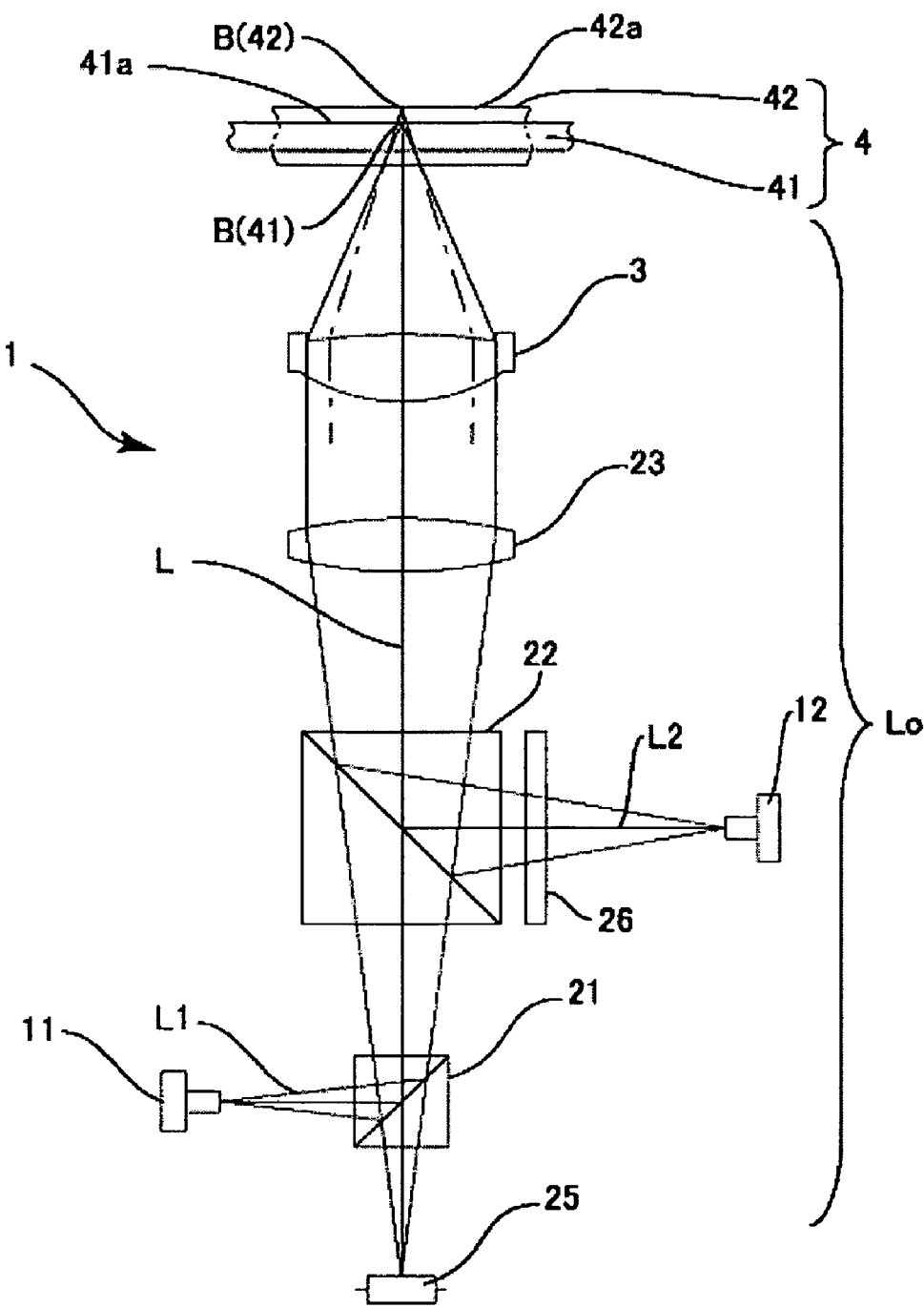
FIG. 1 schematically shows a structure of an optical system of an optical head device in which an objective lens in accordance with an embodiment of the present invention is used.

FIG. 1 schematically shows a structure of an optical system of an optical head device provided with an objective lens in accordance with an embodiment of the present invention.

In FIG. 1, an optical head device 1 in accordance with the present embodiment is constituted so as to perform recording and reproduction of data on or from an optical recording medium 4 such as a CD, a CD-R, and a DVD, which are different in their substrate thickness and recording density. Therefore, the optical head device 1 is provided with a first laser light source 11 emitting a first laser beam L1 with a wavelength of 655 nm used to reproduce data from a DVD and a second laser light source 12 emitting a second laser beam L2 with a center wavelength of 785 nm used to record or reproduce data on or from a CD or the like. Each of the laser beams L1 and L2 is guided to an optical recording medium 4 through a common light converging optical system Lo and the return light of the respective laser beams reflected by the optical recording medium 4 is guided to a common light-receiving element 25.

The light converging optical system Lo includes a beam splitter 21 for reflecting the first laser beam L1 and a beam splitter 22 that reflects the second laser beam L2 and makes the first laser beam L1 go straight. The two laser beams L1, L2 are aligned with the system optical axis L (the optical axis of the objective lens) by the beam splitters 21, 22. The light converging optical system Lo also includes a collimator lens 23 for forming each of the laser beams L1 and L2 in parallel, and an objective lens 3 for forming the beam spot of the laser beams L1 and L2 from the collimator lens 23 on the recording surface of the optical recording medium 4 along the system optical axis L. The beam splitters 21 and 22 make the return light beam from the optical recording medium go straight and guide the return light beam to a common light-receiving element 25. A grating 26 for generating three beams is disposed between the second laser light source 12 and the beam splitter 22.

In the optical head device 1 having a construction described above, the beam spot of the first laser beam L1 is formed on the recording surface 41a of the DVD 41 as the first optical recording medium 4 by the objective lens 3. Also, the beam spot of the second laser beam L2 is formed on the recording surface 42a of the CD 42 as the second optical recording medium 4 by the objective lens 3.

As described above, the first and the second laser beams L1, L2 converged on the optical recording medium 4 (DVD 41 or CD 42) are respectively reflected by the optical recording medium 4 and are returned by the common light converging optical system Lo as a return light beam. The return light beam is transmitted by the beam splitters 22, 21 in this order to converge on the common light-receiving element 25. The reproduction of information or the like from the optical recording medium 4 (DVD 41, CD 42) is performed by signals detected by the common light-receiving element 25.

First Construction Embodiment of Objective Lens

Figure 2:
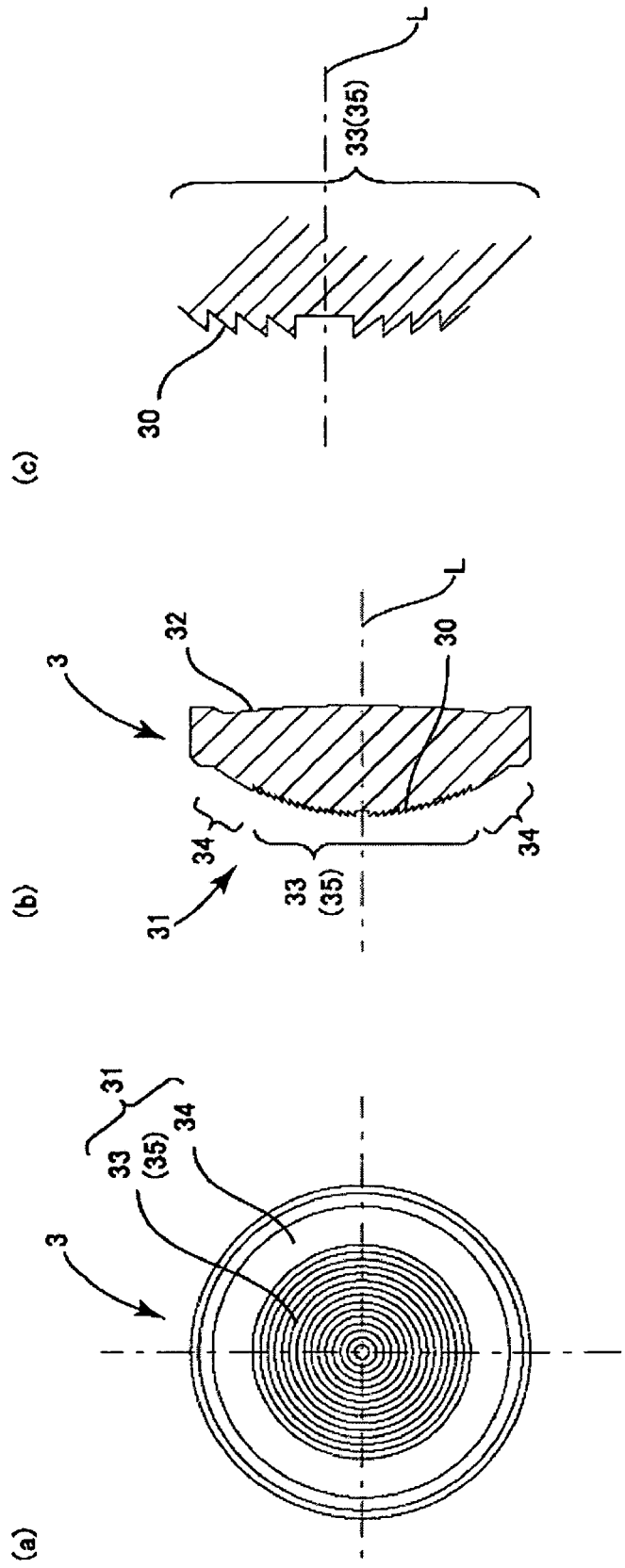
FIG. 2(a) is a plan view of the objective lens in accordance with the embodiment of the present invention.
FIG. 2(b) is a cross-sectional view of the objective lens shown in FIG. 2(a)
FIG. 2(c) is a partly enlarged cross-sectional view of an inner side refraction face region of an incident side refraction surface of the objective lens shown in FIG. 2(b).
Figure 3:
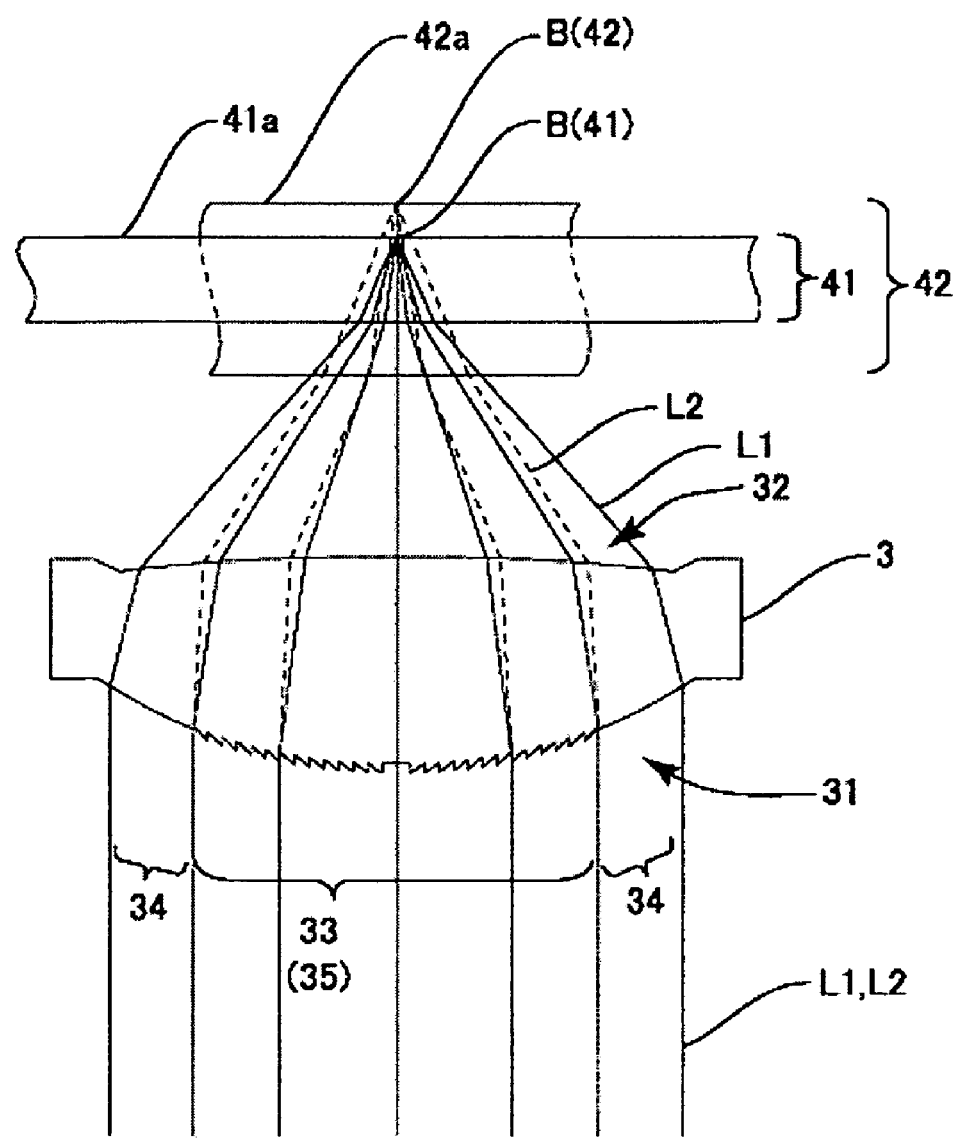
FIG. 3 is an explanatory side view showing converging states of the first and the second laser beams with the use of the objective lens shown in FIGS. 2(a)–2(c).

FIG. 2(a) is a plan view of a first embodiment of the objective lens to which the present invention is applied, FIG. 2(b) is its cross-sectional view and FIG. 2(c) is a partly enlarged cross-sectional view of the inner side refraction face region of an incident side refraction surface of the objective lens shown in FIG. 2(b). FIG. 3 is an explanatory side view showing converging states of the first and the second laser beams with the use of the objective lens shown in FIGS. 2(a)–2(c).

The objective lens 3 shown in FIGS. 2(a), 2(b) and 2(c) is a convex lens provided with an incident side refraction surface 31 having a positive power, to which the laser beams L1, L2 emitted from the first laser light source 11 and the second laser light source 12, respectively, are incident, and an emitting side refraction surface 32 from which the laser beam is emitted toward the optical recording medium 4. Each of the incident side refraction surface 31 and the emitting side refraction face 32 is provided with a prescribed aspheric surface shape.

The incident side refraction surface 31 is formed into two divided regions. One region is an inner side refraction surface region 33 which is formed in a circular shape including the optical axis L and formed concentrically around the optical axis L as the center. The other region is an outer side refraction surface region 34 which surrounds the outer peripheral portion of the inner side refraction surface region 33 in a ring shape.

An inner side diffraction grating 35 is provided with a number of minute blazes (steps) 30 that are formed in a concentrically circular shape all over the area of the inner side refraction surface region 33.

The inner side refraction surface region 33 of the objective lens 3 is a reflection surface region having a refracting power which is different from that of the outer side refraction surface region 34. The inner side diffraction grating 35 formed in the inner side refraction surface region 33 is formed to have such a diffraction characteristic that the beam spot of the diffracted light beam of the second laser beam L2 passing through the inner side refraction surface region 33 is formed on the recording surface 42a of the CD 42. In addition, the inner side diffraction grating 35 is formed to have such a diffraction characteristic that the beam spot of the diffracted light beam of the first laser beam L1 passing through the inner side refraction surface region 33 is formed on the recording surface 41a of the DVD 41.

In the embodiment of the present invention, the first order diffracted light is used as both the diffracted light beam of the second laser beam L2 and the diffracted light beam of the first laser beam L1 generated from the inner side diffraction grating 35.

On the other hand, the outer side refraction surface region 34 of the objective lens 3 is formed to have such a refracting power that the beam spot of the beam portion of the first laser beam L1 passing through the outer side refraction surface region 34 is formed on the recording surface of the DVD 41. In other words, the grooves (steps) with a narrow pitch constituting a diffraction grating are not formed in the outer side refraction surface region 34. Therefore, the die for forming the objective lens 3 is easily manufactured. In addition, since no step portion is formed, a high transmittance of the light beam passing through the outer side refraction area 34 is obtained without loss of the light.

In the optical head device 1 provided with the objective lens 3 as constructed above, the second laser light source 12 is driven to emit the second laser beam L2 when data are reproduced from a CD 42. The beam portion of the second laser beam L2 passing through the inner side refraction surface region 33 of the objective lens 3 is diffracted by the inner side diffraction grating 35 to form the beam spot B(42) of its diffraction light component on the recording surface of the CD 42 as shown by the dotted line in FIG. 3. The beam portion of the second laser beam L2 passing through the outer side refraction surface region 34 of the objective lens 3 is unnecessary light for reproduction and does not converge on the recording surface of the CD 42 as the beam spot.

When data is reproduced from a DVD 41, only the first laser light source 11 is driven to emit the first laser beam L1. As shown by the solid line in FIG. 3, the beam portion in the laser beam L1 passing through the inner side refraction surface region 33 of the objective lens 3 is diffracted by its inner side diffraction grating 35 to generate a diffraction light component which forms the beam spot B(41) on the recording surface of the DVD 41. In addition, the beam portion of the first laser beam L1 passing through the outer side refraction surface region 34 of the objective lens 3 also converges so that the beam spot B(41) is formed on the recording surface of the DVD 41.

In the objective lens 3 having the construction described above in accordance with the embodiment of the present invention, the numerical aperture NA which is prescribed by the outer peripheral side refraction face area 34 is set to be 0.6 so as to correspond to the DVD 41, and the numerical aperture NA of the boundary area between the inner side refraction surface region 33 and the outer side refraction surface region 34 is set to be 0.47 so as to correspond the CD 42.

Second Construction Embodiment of Objective Lens

Figure 4:
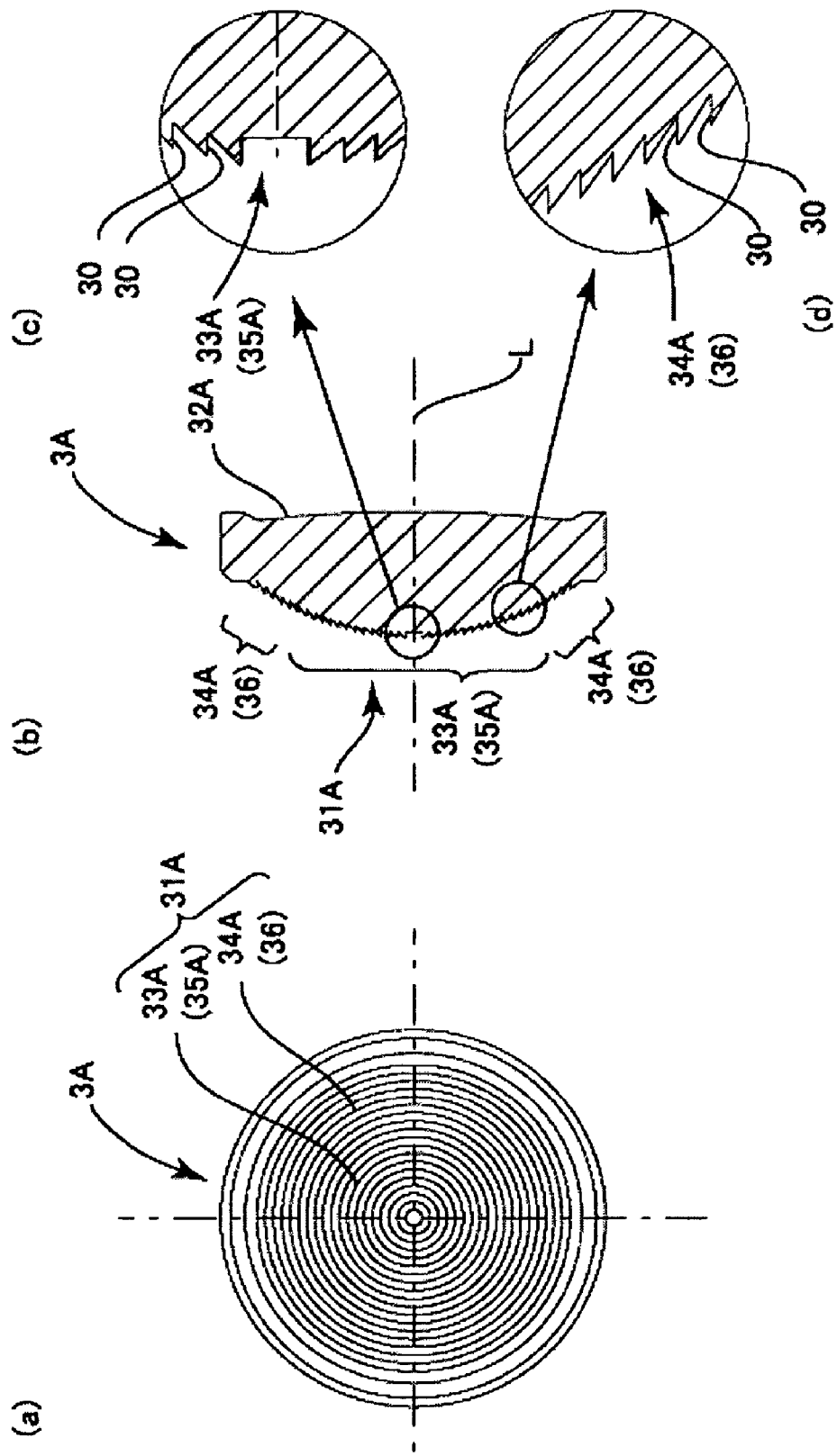
FIGS. 4(a), 4(b), 4(c) and 4(d) are views of an objective lens in accordance with another embodiment of the present invention.

FIGS. 4(a), 4(b), 4(c) and 4(d) are views of a second embodiment of the objective lens in which a diffraction grating is also formed on the outer side refraction surface region. FIG. 4(a) is a plan view of the objective lens, FIG. 4(b) is its cross-sectional view, and FIGS. 4(c) and 4(d) are partly enlarged cross-sectional views of the objective lens shown in FIG. 4(b).

In the objective lens 3 according to the first embodiment described with reference to FIGS. 2(a)–2(c), the beam spot by using the beam component of the first laser light beam passing through the outer side refraction face region 34 is formed on the recording surface of the DVD 41 by setting the refracting power of the outer side refraction face region 34 to an appropriate value. Alternatively, according to the second embodiment of the present invention, the diffraction grating may be also formed on the outer side refraction face region 34 such that the beam spot of the diffracted light beam component of the first laser beam L1 passing through the diffraction grating can be formed on the recording surface of the DVD 41.

The objective lens 3A shown in FIGS. 4(a), 4(b), 4(c) and 4(d) is a convex lens which is provided with an incident side refraction surface 31A having a positive power, to which the laser beams L1 and L2 emitted from the first laser light source 11 and the second laser light source 12 are incident, and an emitting side refraction surface 32A from which the laser beam is emitted toward the optical recording medium.

The incident side refraction surface 31A is formed into two divided regions. One is an inner side refraction surface region 33A that is formed in a circular shape including the optical axis L. The other is an outer side refraction surface region 34A that concentrically surrounds the inner side refraction surface region 33A in a ring shape. The inner side refraction surface region 33A is formed with an inner side diffraction grating 35A including fine blazes (steps) 30 that are formed in a concentrically circular shape all over the area of the inner side refraction surface region 33A. Also, the outer side refraction surface region 34A is formed with an outer side diffraction grating 36 including fine blazes (steps) 30 that are formed in a concentrically circular shape all over the area of the outer side diffraction grating 36.

According to the objective lens 3A in accordance with the second embodiment of the present embodiment, a beam spot is formed on the recording surface 42a of the CD 42 by the light beam component passing through the inner side refraction surface region 33A of the second laser beam L2 which is emitted at the time of recording or reproducing onto or from the CD 42. Specifically, the beam spot B(42) is formed on the recording surface of the CD 42 by the diffracted light beam component of the second laser beam L2 which is diffracted by the inner side diffraction grating 35A formed on the inner side refraction surface region 33A.

The beam portion of the second laser beam L2 passing through the outer side refraction surface region 34 of the objective lens 3 is unnecessary light for recording or reproduction. In the embodiment of the present invention, the beam portion passing through the outer side refraction surface region 34A is subjected to the diffraction effect by the outer side diffraction grating 36 formed on the outer side refraction surface region 34A so as to be diffracted not to converge at the beam spot forming position on the recording surface of the CD 42.

Further, the objective lens 3A in the second embodiment of the present invention forms the beam spot of the first laser beam L1 emitted at the time of reproduction of a DVD 41 on the recording surface 41a of the DVD 41. In other words, the beam portion of the first laser beam L1 passing through the inner side refraction surface region 33A of the objective lens 3 is diffracted by its inner side diffraction grating 35A of the inner side refraction surface region 33A to generate the diffracted light component which forms the beam spot B(41) on the recording surface 41a of the DVD 41. In addition, the beam portion of the first laser beam L1 passing through the outer side refraction surface region 34A of the objective lens 3 is diffracted by the outer side diffraction grating 36 formed on the outer side refraction surface region 34A And the beam spot B(41) is formed at the same position as that formed by the inner side diffraction grating 35A on the recording surface 41a of the DVD 41 by the diffracted light component of the first laser beam L1 which is generated by the diffraction effect caused by the outer side diffraction grating 36.

In the second embodiment of the present invention, the first order diffracted light beam of both the first laser beam L1 and the second laser beam L2 is used for the reproduction from the DVD 41 and the recording or reproduction on or from the CD 42.

Further, with the objective lens 3A according to the second embodiment of the present invention, the outer side diffraction grating 36 is formed on the outer side refraction surface region 34A. The height of the blaze 30 of the outer side diffraction grating 36 is set such that the unnecessary light beam component of the second laser beam L2 passing through the outer side portion does not converge at the beam spot forming position on the recording surface of CD 42. As a result, since the phases of the first laser beam L1 passing through the inner side region and outer side region can be aligned with each other, a satisfactory wave front aberration can be obtained and the transmittance can be improved.

Therefore, a satisfactory reproduction performance can be obtained in comparison with the case that the light beam component passing the outer peripheral side is not diffracted.

With the objective lens 3A having the construction described above in accordance with the second embodiment of the present invention, the numerical aperture NA prescribed by the outer side refraction surface region 34A is set to be 0.6, which corresponds to the DVD 41, and the numerical aperture NA of the boundary region between the inner side refraction surface region 33A and the outer side refraction surface region 34A is set to be 0.47, which corresponds to the CD 42.

Detailed Construction of Objective Lens

The detailed construction of the objective lens in accordance with the embodiment of the present invention will be described below. The present invention relates to the inner side refraction surface region 33A of both the objective lenses 3 and 3A to which the first laser beam and the second laser beam are incident and the present invention can be applied to both the objective lenses 3 and 3A. However, the measured values such as the aberration or the jitter characteristics in the following explanation are the measured results for the objective lens 3A described with reference to FIGS. 4(a)–4(c).

Figure 5:
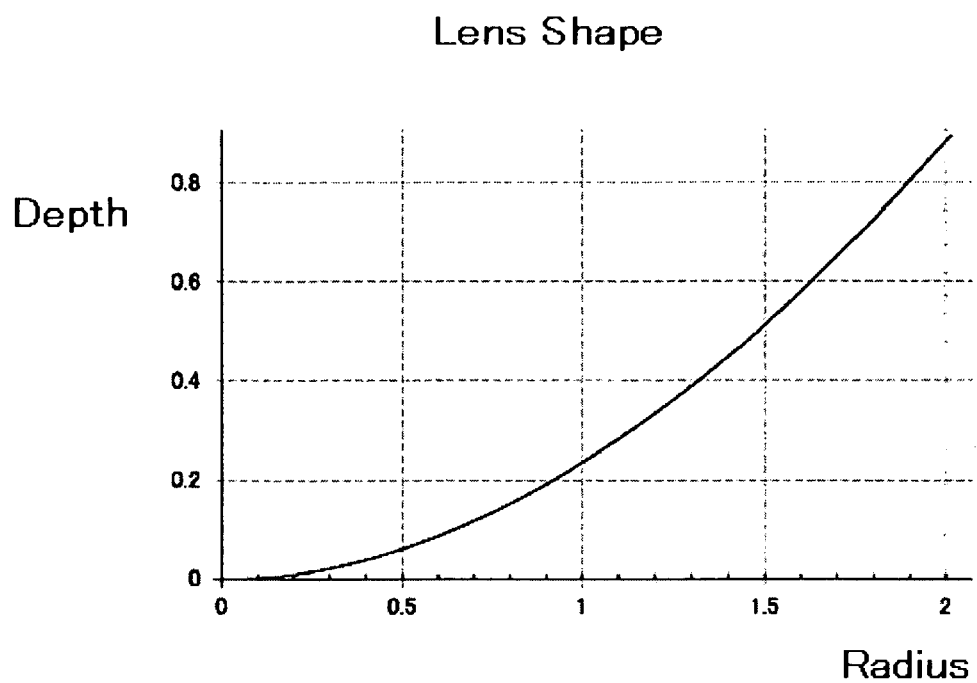
FIG. 5(a) is an explanatory view showing the shape of the aspheric surface representing the refraction in the optical design of the objective lens.
FIG. 5(b) is an explanatory view of the blaze shape which is determined by performing the ray tracing with the optical path difference function.
Figure 5:
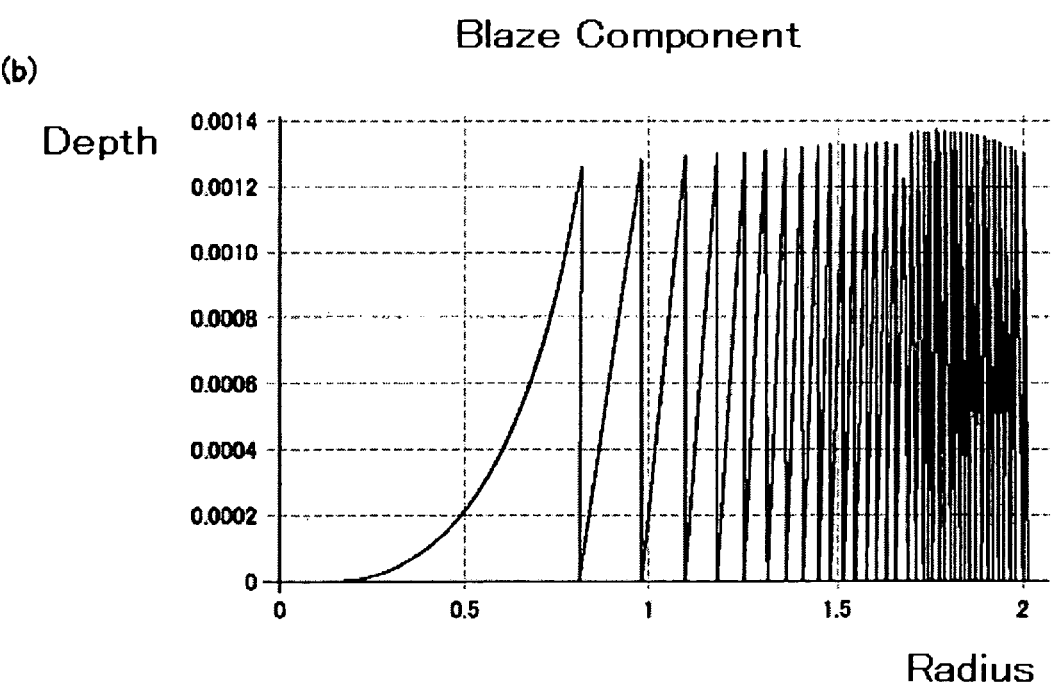
Figure 6:
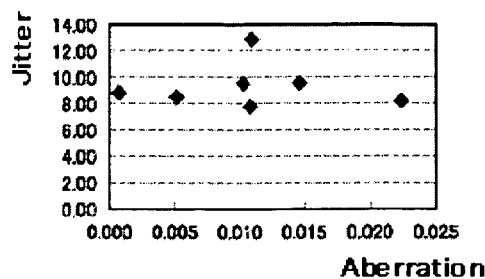
FIGS. 6(a) through 6(e) are charts which respectively show the effects of the third spherical aberration, the fifth spherical aberration, the seventh spherical aberration, and the ninth spherical aberration, and the effects of the square root of the sum of the squares of the fifth spherical aberration, the seventh spherical aberration, the ninth spherical aberration of the inner side diffraction grating of the objective lens shown in FIGS. 2(a)–2(c) to the jitter characteristics for reproduction of a DVD with the first laser beam.
Figure 6:
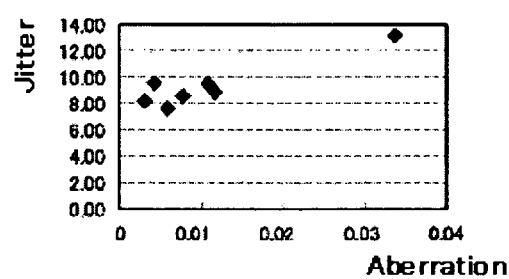
Figure 6:
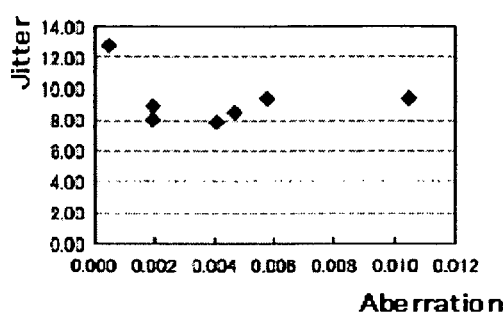
Figure 6:
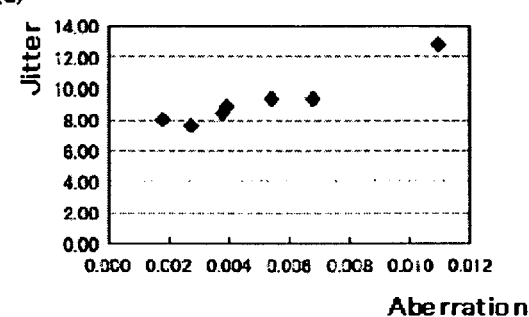
Figure 6:
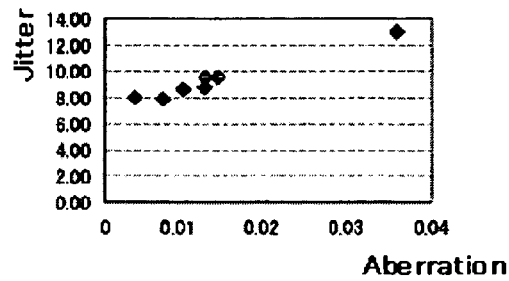
Figure 7:
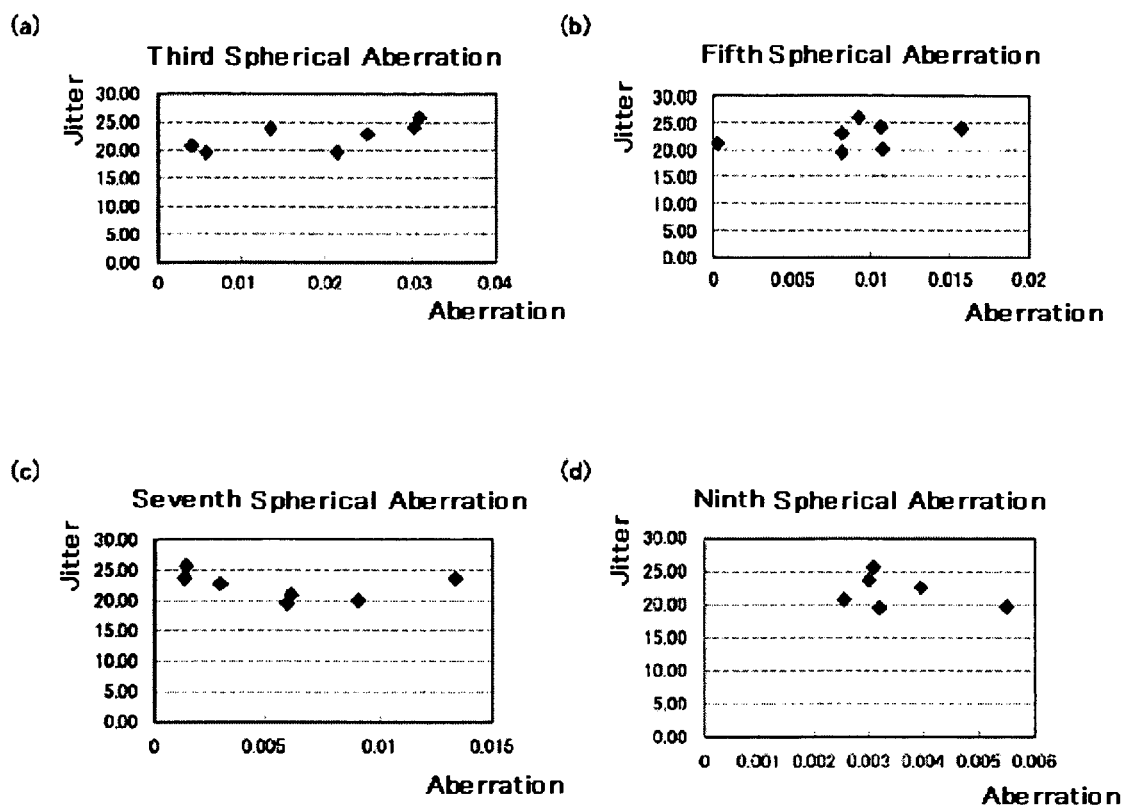
FIGS. 7(a) through 7(d) are charts which respectively show the effects of the third spherical aberration, the fifth spherical aberration, the seventh spherical aberration, and the ninth spherical aberration of the inner side diffraction grating of the objective lens shown in FIG. 2(a)–2(c) to the jitter characteristics for reproduction of a CD with the second laser beam.

FIG. 5(a) is an explanatory view showing the shape of the aspheric surface representing the refraction in the optical design of the objective lens, and FIG. 5(b) is an explanatory view of the blaze shape that is determined by performing ray tracing with the optical path difference function. FIGS. 6(a) through 6(e) are charts which respectively show the effects of the third spherical aberration, the fifth spherical aberration, the seventh spherical aberration, and the ninth spherical aberration, and the effects of the square root of the sum of the squares of the fifth spherical aberration and the seventh spherical aberration and the ninth spherical aberration of the inner side diffraction grating of the objective lens shown in FIGS. 2(a)–2(c) to the jitter characteristics for reproduction of the DVD with the first laser beam. FIGS. 7(a) through 7(d) are charts which respectively show the effects of the third spherical aberration, the fifth spherical aberration, the seventh spherical aberration, and the ninth spherical aberration of the inner side diffraction grating of the objective lens shown in FIG. 2(a)–2(c) to the jitter characteristics for reproduction of a CD with the second laser beam.

In accordance with the embodiment of the present invention, when the objective lenses 3 and 3A are constructed, the shape of the aspheric surface representing the refraction as shown in FIG. 5(a) is obtained in the optical design by using the following expression:

$$z(h) \frac{h^2}{r\left(1 + \sqrt{1 - \frac{1+(k)h^2}{r^2}}\right)} + \left(\sum_{i=0}^{1} a_i h^{(2i)}\right)$$

And a correction is performed so as to make the aberration small by executing ray tracing with the optical path difference function representing the diffraction, which is expressed by the following expression:

$$\Theta(h) = \lambda \sum_{i=0}^{1} b_j h^{(2j)}$$

Then, the result is replaced with the shape of the blaze working as shown in FIG. 5(b). The blaze shape shown in FIG. 5(b) is performed with the shape correction corresponding to the incidence angle with respect to the refraction face. Here, "r" means the radius of curvature of the center, "k" means the conical coefficient, "h" means the height from the optical axis, "λ" means the wavelength, and "ai" and "bj" mean the coefficient of the polynomial.

When the blaze height is determined with the wavelength $\lambda_B$, the height of the blaze component from the aspheric surface is calculated by the expression;

$$\phi(\lambda_B)/(n-1)$$

wherein "φ" is the optical path difference function and "n" is the refractive index. "$\lambda_B$" is referred to as the blaze wavelength and set to satisfy the following condition:

$$\lambda_1 < \lambda_B < \lambda_2$$

$\lambda_1$=wavelength of laser beam L1 for a DVD $\lambda_2$=wavelength of laser beam L2 for a CD In the case the correction is performed so as to make the aberration become zero by executing ray tracing with the optical path difference function, when the inner side diffraction grating 35 is used with the wavelength of $\lambda_1$, the difference between the case that is blazed with the wavelength $\lambda_1$ and the case that is blazed with the wavelength $\lambda_B$ causes a spherical aberration $SA_1$ with the wavelength $\lambda_1$ to occur. In addition, when the inner side diffraction grating 35 is used with the wavelength $\lambda_2$, the difference between the case that is blazed with wavelength $\lambda_2$ and the case that is blazed in the wavelength $\lambda_B$ causes a spherical aberration $SA_2$ with the wavelength $\lambda_2$ to occur. The codes of the spherical aberration $SA_1$ and the spherical aberration $SA_2$ are the reverse of each other.

According to the embodiment of the present invention, the numerical apertures NA of the first laser beam L1 and the second laser beam L2 are set to satisfy the following conditions:

Numerical aperture NA of the first laser beam L1>0.58

Numerical aperture NA of the second laser beam L2<0.53

Further, when the diffraction performance in the common diffraction grating (inner side diffraction grating 35) with the first laser beam L1 and the second laser beam L2 is expressed with the optical path difference function, the wave front aberration calculated by the optical path difference function is set such that the third spherical aberration $SA3_1$ of the first laser beam L1 and the third spherical aberration $SA3_2$ of the second laser beam L2 satisfy the following two expressions:

$$0.005 < |SA3_1 - SA3_2| < 0.015 \ [\lambda rms] \quad (1)$$

$$SA3_1 \times SA3_2 < 0 \quad (2)$$

In other words, $\phi(\lambda_1)$ and $\phi(\lambda_2)$ are not set to be zero but a certain aberration is set and taken into account in advance as follows:

$$\phi(\lambda_1) - \phi(\lambda_2) = -(SA_1 - SA_2)$$

Therefore, the aberration after actually having been machined can be reduced.

On the other hand, when the difference between the third spherical aberration $SA3_1$ of the first laser beam L1 and the third spherical aberration $SA3_2$ of the second laser beam L2 exceeds the lower limit or the upper limit of the expression (1) described above, at least one of the third spherical aberrations of the DVD and the CD deteriorates after blaze working has been performed. Further, the above-mentioned expression (2) is the condition which provides the effect for reducing the spherical aberration after blaze working has been performed when the blaze wavelength λ is between $\lambda_1$ and $\lambda_2$.

According to the optical design described above, when the conditions with respect to the DVD and the CD are set to be as follows and the blaze wavelength $\lambda_B$ is 700 nm, the third spherical aberration SA3 expressed by the optical path difference function and the blazed third spherical aberration is obtained as follows.

|  | DVD | CD |
| --- | --- | --- |
| NA | 0.6 | 0.47 |
| Disk Thickness | 0.6 mm | 1. 2mm |
| Wavelength | $\lambda_1$ = 655 nm | $\lambda_2$ = 785 nm |

The third spherical aberration expressed by the optical path difference function:

DVD=+0.007 [λrms]

CD=−0.003 [λrms]

The blazed third spherical aberration:

DVD=+0.001 [λrms]

CD=+0.008 [λrms]

Particularly, the third spherical aberration in the DVD is suppressed.

On the other hand, as the conventional optical design, when the third spherical aberration SA3 expressed by the optical path difference function is set to be closer to zero as follows, the blazed third spherical aberration is obtained as follows:

DVD=+0.002 [λrms]

CD=−0.001 [λrms]

The blazed third spherical aberration:

DVD=−0.007 [λrms]

CD=+0.010 [λrms]

As a result, the third spherical aberration becomes large.

Further, in the embodiment of the present invention, the effects of the third, the fifth, the seventh and the ninth spherical aberrations SA3, SA5, SA7 and SA9, respectively, and the square root of the sum of their squares ($\sqrt{(SA3)^2 + (SA5)^2 + (SA7)^2 + (SA9)^2}$) with respect to the jitter characteristics are measured. The results are shown in FIGS. 6(a) through 6(e) and FIGS. 7(a) through 7(d).

By examining these results, and under the conditions that the performance of the DVD is given priority in which the higher performance is demanded because its recording density is higher and the value of the jitter is aimed to be lower than 10, the jitter characteristics are improved when the fifth spherical aberration $SA5_1$, the seventh spherical aberration $SA7_1$, and the ninth spherical aberration $SA9_1$ of the first laser beam, and the fifth spherical aberration $SA5_2$ of the second laser beam satisfy the following conditional expressions:

$$0.005 < |SA5_1 - SA5_2| < 0.015 \ [\lambda \text{rms}] \quad (3);$$

$$0.001 \ \lambda \text{rms} < |SA5_1| < 0.015 \ [\lambda \text{rms}] \quad (4);$$

$$(SA5_1)^2 + (SA7_1)^2 + (SA9_1)^2 < 0.0002 \ [\lambda \text{rms}]^2 \quad (5);$$

The range in the expression (3) is capable of satisfying the conditional expressions (4) and (5) based on the actual measurements and is capable of blazing without deteriorating the third spherical aberration when blazed after the optical design.

The present invention can be applied to an optical element other than the objective lens 3 and 3A through which both the laser beams with different wavelengths pass in the optical head device 1.

As described above, in the present invention, the optical design is performed so as to reduce aberration by executing ray tracing using the function expressing the aspheric surface shape and the function expressing the optical path difference. According to the present invention, the aberration is not corrected to zero in the optical design but the prescribed aberration is anticipated such that the aberration after blaze machining is actually small and then replaced with the shape of blaze working. Accordingly, the aberration after blazed working with respect to the desired laser beam can be suppressed to a small value.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical element, comprising:
    a diffraction grating by which both of a first laser beam and a second laser beam are diffracted,
    wherein a fifth spherical aberration $SA5_1$, a seventh spherical aberration $SA7_1$, and a ninth spherical aberration $SA9_1$ of the first laser beam, and a fifth spherical aberration $SA5_2$ of the second laser beam satisfy in the following conditional expressions:

$$0.005 < |SA5_1 - SA5_2| < 0.015 \ [\lambda \text{rms}]$$

$$0.001 < |SA5_1| < 0.015 \ [\lambda \text{rms}]$$

$$(SA5_1)^2 + (SA7_1)^2 + (SA9_1)^2 < 0.0002 \ [\lambda \text{rms}]^2.$$

2. The optical element according to claim 1, wherein the first and second laser beams are diffracted and coveraged.

3. The optical element according to claim 1, wherein the second laser beam has a wavelength longer than a wavelength of the first laser beam.

4. The optical element according to claim 1, further comprising a first beam splitter that splits the first laser beam and a second beam splitter that splits the second laser beam.

5. A lens, comprising:
    a diffraction grating by which both of a first laser beam and a second laser beam are diffracted,
    wherein a fifth spherical aberration $SA5_1$, a seventh spherical aberration $SA7_1$, and a ninth spherical aberration $SA9_1$ of the first laser beam, and a fifth spherical aberration $SA5_2$ of the second laser beam satisfying the following conditional expressions:

$$0.005 < |SA5_1 - SA5_2| < 0.015 \ [\lambda \text{rms}]$$

$$0.001 < |SA5_1| < 0.015 \ [\lambda \text{rms}]$$

$$(SA5_1)^2 + (SA7_1)^2 + (SA9_1)^2 < 0.0002 \ [\lambda \text{rms}]^2.$$

6. The lens according to claim 5, wherein the first and second laser beams are diffracted and coveraged.

7. The lens according to claim 5, wherein the second laser beam has a wavelength longer than a wavelength of the first laser beam.

8. The lens according to claim 5, further comprising a first beam splitter that splits the first laser beam and a second beam splitter that splits the second laser beam.

9. An optical head device, comprising:
    a first laser beam which is emitted from a first laser light source and converges on a recording surface of a first optical recording medium;
    a second laser beam with a wavelength longer than a wavelength of the first laser beam, the second laser beam being emitted from a second laser light source and converging on a recording surface of a second optical recording medium having a transparent protective layer thicker than a transparent protective layer of the first optical recording medium;
    a common optical element disposed on a common optical path of the first laser beam and the second laser beam for diffracting and guiding the first laser beam and the second laser beam on the recording medium of the first optical recording medium and the recording surface of the second optical recording medium; and
    a diffraction grating provided on the common optical element by which both the first laser beam and the second laser beam are diffracted,
    wherein a fifth spherical aberration $SA5_1$, a seventh spherical aberration $SA7_1$, and a ninth spherical aberration $SA9_1$ of the first laser beam, and a fifth spherical aberration $SA5_2$ of the second laser beam satisfying the following conditional expressions:

$$0.005 < |SA5_1 - SA5_2| < 0.015 \ [\lambda \text{rms}]$$

$$0.001 < |SA5_1| < 0.015 \ [\lambda \text{rms}]$$

$$(SA5_1)^2 + (SA7_1)^{2+(SA9_1)^2} < 0.0002 \ [\lambda \text{rms}]^2.$$

10. The optical head device according to claim 9, wherein the optical element is an objective lens comprising:
    an incident side refraction surface and an emitting side refraction surface formed in a prescribed aspheric surface shape, one of the incident side refraction surface and the emitting side refraction surface being divided into an inner side refraction surface region and an outer side refraction surface region around an optical axis of the object lens, an inner side diffraction grating being formed all over the inner side refraction surface region and being provided with a number of minute steps in a concentrically circle-shape, wherein a beam passing through the outer side refraction surface region and a diffracted beam which is obtained through the inner side refraction surface region are used in recording and reproduction for the first optical recording medium by using the first laser light source, and a diffracted beam which is obtained through the inner side refraction surface region is used in recording and reproduction for the second optical recording medium by using the second laser light source.

* * * * *